Patented May 21, 1940

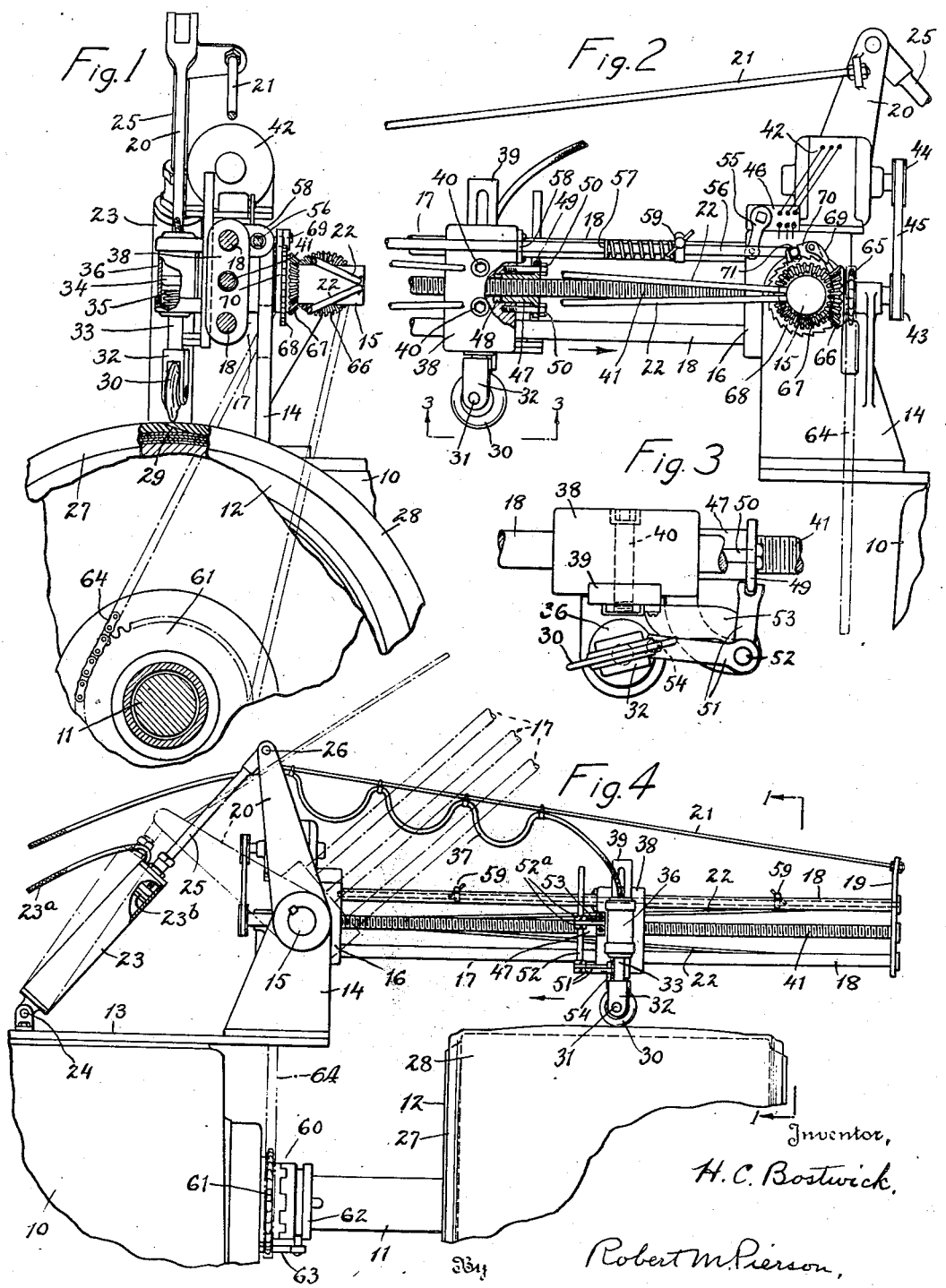

2,201,470

UNITED STATES PATENT OFFICE 2,201,470

TIRE TREAD SPLICE STITCHER

Henry C. Bostwick, Coventry Township, Summit County, Ohio, assignor to The Akron Standard Mold Company, Akron, Ohio, a corporation of Ohio Application April 4, 1938, Serial No. 199,779

9 Claims. (Cl. 154—10)

This invention relates to the building of pneumatic tire casings. It has for its object to provide improved means for applying mechanical pressure, by a rolling motion exerted lengthwise of the axis of the casing, and extending either straight across or diagonally, to the seam or splice connecting the ends of any component ply, and particularly outer plies such as a breaker strip or the raw rubber tread on a tire-forming band.

Heretofore the skived or beveled ends of the tread band, surrounding the carcass on the drum of a tire-building machine, after being lightly stuck together while the drum is held stationary, have been stitched or further pressed along the seam by a roller tool in the hands of the operator. Other transverse seams have been similarly stitched with a hand tool. In the case of the larger tires particularly, including those used on tractors and other heavy vehicles, requiring a relatively wide band, this manual stitching operation is slow and laborious. The present invention substitutes a mechanical power-operated splice stitching device, which may be made partly or wholly automatic, at a great saving in time and labor, and also improves the quality of the work. It may be incorporated in new tire-building machines, or supplied as an attachment to existing ones.

Of the accompanying drawing, Fig. 1 is a partial end elevation and transverse section, approximately on the line 1—1 of Fig. 4, showing a preferred form of my invention.

Fig. 2 is a partial side elevation and section, as viewed from the operator's position.

Fig. 3 is a bottom view of the stitcher tool and its immediate mounting members.

Fig. 4 is an elevation, partly in section, on the side opposite to Fig. 2.

In the drawing, 10 is the casing of a tire-building machine, from which projects a horizontal rotary power shaft 11 carrying the usual collapsible building form or drum 12 at its outer end. A plate 13, mounted on the upper side of the casing 10, forwardly supports a bracket 14 having a bearing at its upper end for a transverse rock-shaft 15. To this shaft is attached the hub block 16 of an arm-like tool-mounting structure 17 which includes a pair of parallel guide rods 18, a plate 19 connecting their outer ends, a rear arm 20 on one end of shaft 15, an overhead brace rod 21 connecting said arm with the plate 19, and a pair of divergent lateral brace rods 22 connecting the other end of shaft 15 with the plate 19. A fluid-pressure ram cylinder 23, mounted inwardly of the bracket 14, in an inclined position, has its lower end pivoted at 24 to a small bracket on the plate 13, and the upper end of its piston rod 25 pivotally connected at 26 with the upper end of the arm 20. The ram effects backward swinging of said arm to elevate the tool mounting structure to the position shown in broken lines in Fig. 4, when fluid pressure is admitted to the upper end of the cylinder through a hose 23$^a$, and permits it to descend by gravity into an operative position when the pressure is released, in which position the ram piston 23$^b$ is arrested by reaching an internal stop on the cylinder head.

27 indicates a laminated tire-forming band, constituting the work which has been built up on the drum 12 and including an outer layer 28 of tread and sidewall rubber, commonly called the tread band, whose skived diagonal ends are lapped together as represented in Fig. 1 to form the tread splice or seam 29. Said seam requires pressure rolling or "stitching," imparted in this case by a roller 30, to perfect the adhesion of its parts. During the feeding traverse of roller 30, imparted as hereinafter described, the drum shaft 11 may be disconnected from its power in the usual manner, and the drum 12 either held stationary for a splice running straight across, or rotated by hand or otherwise for a diagonal or helical splice, or one of more or less wavy course.

The roller 30 turns, by contact with the work, upon a short shaft or pin 31 which is carried by the ears of a clevis bracket 32, at the lower end of a rod 33, the latter being capable of both vertical sliding and horizontal turning movements. To the upper end of said rod is attached a piston 34 having a cushion spring 35 below it and movable in a cylinder 36, in the upper end of which a light air pressure is maintained through a hose 37, to furnish the desired roller pressure on the splice, against the effective weight of the structure. Cylinder 36 is mounted upon a feed carriage 38, slidable along the guide rods 18, and is made vertically adjustable thereon for different drum diameters by providing it with a vertically slotted base plate 39, secured at different heights on the carriage by bolts 40 extending through its slot.

A horizontal feeding traverse is imparted to the tool carriage, longitudinally of the drum axis, by means of a screw 41 mounted between and parallel with the guide rods 18 and turning in bearings on the hub block 16 and end plate 19. This screw is independently driven by an electric motor 42 mounted on top of the hub block 16, through pulleys 43, 44 on the screw and armature shafts and a connecting belt 45. The circuit of the motor is controlled by an ordinary limit switch 46, which is automatically actuated in a manner to be described, so that the direction of rotation of the screw may be reversed at the ends of the tool stroke.

The threads of the screw 41 engage with those of a nut 47 having a stem slidable in a socket 48 in the tool carriage 38, and an outer end flange 49 adapted to engage the heads of a pair of screws 50 mounted in said carriage, so that the carriage may have some lost motion at the ends of its stroke, limited in opposite directions by the nut stem engaging the bottom of socket 48, and the flange 49 engaging the heads of the screws 50. This lost motion is utilized to turn the clevis rod 33 of the stitching roller 30 so that the plane of said roller will lie slantingly at a small angle with reference to an elemental line of the drum 12 during the tool stroke in one direction, and at an opposite angle during movement in the opposite direction. The inclination in either direction is such that the working edge of the roller, in contact with the upper lip of the splice 29, wipes or strokes said lip toward the thin edge thereof and thereby produces a slight flow of the rubber lip, which makes a better seam.

The angular shifting of the roll holder is accomplished by means of a bell-crank lever 51, mounted on the lower end of a vertical pivot shaft 52 carried by a bracket 53 on the tool carriage 38. The weight of shaft 52 and lever 51 is supported on the bracket 53 by a collar 52ª which may be fixed by a set-screw at different heights on said shaft corresponding to the vertical position of cylinder 36 in the carriage 38. Lever 51 has a short arm with a forked end receiving the edge of the nut flange 49, and a long arm with a forked end engaging an upwardly-extending pin 54 on the roller clevis 32, the clevis being thereby turned in one direction or the other when the tool carriage shifts in relation to its nut.

Reversal of the motor limit switch 46 is effected by providing an arm 55 on the switch shaft, connected with a rod 56 having a pair of spring stops 57, one of which is shown in Fig. 2, adapted to be encountered by a trip plate 58 on the tool carriage 38 at the ends of the latter's stroke. The position of said stops upon the rod may be varied by shifting a clamping collar 59 with which each stop is provided, and the length of the tool stroke will thereby be correspondingly varied according to the width, or axial length, of the band 27 upon the drum 12.

Provision is further optionally made, or may be omitted if desired, for imparting a short, step-by-step rotary indexing feed to the drum 12, to bring the strokes of the stitching roller 31 over a widened zone, beginning some distance back of the edge of the upper lip on splice 29 and terminating at said edge. This indexing is accomplished, in part, by providing a jaw clutch 60 on the drum shaft 11, having a loose chain sprocket member 61, and a splined member 62 which may be closed by a manual lever 63 when it is desired to index the drum shaft. Said sprocket member is connected by a chain 64 with another sprocket wheel 65 on the hub of a bevel gear 66. The latter meshes with a mating gear 67 journaled on the shaft 15 and having a ratchet wheel 68 engaged by a pawl 69. The pawl is pivoted on a forked rocker 70 loosely surrounding shaft 15 and is actuated by a pin 71 laterally projecting from the rod 56, so that when the tool carriage 38 engages one of the stops 57 at the end of its stroke, the pawl 69 will be either retracted or projected, and the indexing movement imparted when it is projected, concurrently with the throwing of the limit switch 46.

In the operation of this apparatus, after the flat or semi-flat tire band 27, including an outer rubber tread band 28, has been built up on the drum 12, while arm structure 17 is elevated as shown in broken lines in Fig. 4, rotation of the drum is stopped when the tread ends are in the top position, and said ends are stuck lightly together at the seam or splice 29. Arm structure 17 is then brought down into operative position by release of air pressure from the upper end of ram cylinder 23, causing the stitching roller 30 to rest upon the tread seam.

On starting the electric motor 42, it causes rotation of the screw 41 and feeds the roller longitudinally of the drum axis, producing a yielding compacting pressure upon the seam against the air pressure in the upper end of cylinder 36. By reason of the slight inclination of the plane of roller 30 to the direction of the seam, as best indicated in Figs. 1 and 2, said roller produces a wiping action on the upper seam ply, toward the feather-edge of the latter, which improves the adhesion. Assuming feed motion in Fig. 1 away from the observer, the described direction of this wiping action will be evident.

At the end of the inward or leftward tool stroke in Fig. 4, tool carriage 38 encounters the left-hand spring stop 57 (shown oppositely in Fig. 2), whose adjustment has been fixed by its clamping collar 59, and moves the rod 56 and the arm 55 of limit switch 46 to reverse the direction of rotation of the armature shaft of motor 42 and the direction of turning of the feed screw 41. The first effect is to shift the nut 47 relatively to the carriage 38, moving its stem inwardly to the bottom of socket 48 and the flange 49 away from the heads of screws 50, thereby turning the lever 51 and roller clevis 32 to bring the plane of the roller 30 to an opposite inclination, so that the wiping action of said roller may again be toward the edge of the upper splice lip on the return or outward stroke of carriage 38, under propulsion of the nut 47. The return stroke ends when carriage 38 encounters the outer one of the stops 57, shifting the rod 56 to again reverse the motor 42, and the reciprocating feed of the roller 30 is indefinitely continued until the operator cuts off the current from the motor 42 when the seam has been sufficiently rolled. The shifting of rod 56 at the end of the instroke of the tool carriage projects the pawl 69, stepping the ratchet wheel 68 ahead one tooth and correspondingly indexing the drum in a clockwise direction as viewed in Fig. 1, through the intervening drive train 68, 66, 65, 64, 61 and clutch 60, if the latter's splined member 62 has been engaged. When a drum of different diameter is substituted, the vertical position of the tool holder including cylinder 36 and slotted plate 39 may be correspondingly shifted, on loosening and resetting the retaining bolts 40, and the position of collar 52ª likewise shifted on its rod 52, in the manner previously described.

It will be understood that the described form of embodiment could be changed in many particulars without departing from the scope of the invention as defined in the claims.

I claim:

1. A tread-splice stitcher comprising a support mountable on a tire machine, an arm structure pivoted to swing thereon into and out of operative position and including a hub member, a rectilinear carriage guide and a parallel feed screw, a tool carriage movable along said guide by rotation of the screw, an electric motor mounted on the hub member and having a driving connection to said screw, and a tread-splice rolling tool mounted on said carriage on an axis transverse to the guide and rollable longitudinally of the guide along the work, while the latter is stationary.

2. A tire machine comprising a horizontal rotary power shaft, a building drum thereon, an arm structure over the drum, pivoted to swing vertically in the plane of the shaft, into and out of operative position, and including a rectilinear carriage guide, a tool carriage thereon, an electric motor connected to impart a feeding traverse to said carriage, and a tread-splice rolling tool mounted on said carriage and rollable longitudinally of the axis of the building drum, on an axis transverse to said drum axis, while the drum is stationary.

3. In a tire-building machine, the combination of a rotary building drum, a roller carriage, means for reciprocating said carriage longitudinally over the drum, a stitching roller rollable longitudinally of a tread splice on the drum, on an axis transverse to the drum axis, while the drum is stationary, and a roller mounting angularly adjustable on the carriage to position the plane of the roller at opposite inclinations to the path of the carriage.

4. A tread-splice stitcher comprising a tool carriage, means for reciprocating said carriage, a tread-splice rolling tool having a support on the carriage, angularly shiftable to opposite inclinations with respect to the path of said carriage, said tool being rotatable on an axis transverse to said path, for rolling a tire-band tread splice while the band is stationary, and means actuated by travel of the carriage for automatically so shifting the tool support at the end of the carriage stroke in each direction.

5. In a tire-building machine, the combination of a rotary building drum, a carriage guide arranged axially thereof, a parallel feed screw and means for rotating it, a nut on the screw, a tool carriage propelled by said nut along the guide and having a lost motion with respect to the nut at the end of the latter's feed stroke in each direction, and a splice roller tool on the carriage, rollable therewith longitudinally of a tread splice on the drum, and having a mounting angularly shiftable, by means of said lost motion of the carriage, to position the plane of the roller tool at opposite inclinations to the path of the carriage.

6. In a tire-building machine, the combination of a rotary building drum, a tread-splice roller having an axis of rotation transverse to the drum axis, and operable while the drum is stationary, guided for rectilinear movement thereover and mounted for shifting its plane angle, an electric motor for imparting a feeding traverse to the roller, said motor having a reversible limit switch, and means actuated at the end of travel of the roller in each direction for concurrently throwing said limit switch and angularly shifting the roller plane angle.

7. In a tire-building machine, the combination of a rotary power shaft, a building drum thereon, a rotary pressing tool rollable along the splice of a rubber tread on the drum, by contact with the work, and means actuated by traverse of the roller, at one end of its stroke, for imparting an indexing rotary feed to the drum.

8. Apparatus according to claim 7 having ratchet and pawl means for indexing the drum.

9. Apparatus according to claim 8 having a positive clutch on the drum shaft, for connecting the indexing feed with said shaft and disconnecting it therefrom.

HENRY C. BOSTWICK.